(12) United States Patent
Hu et al.

(10) Patent No.: US 6,209,349 B1
(45) Date of Patent: Apr. 3, 2001

(54) AIR CONDITIONING CONDENSER COMPRISING A RESERVOIR MOUNTED ON A BASE

(75) Inventors: Zaiqian Hu, Guyancourt; Gérard Gille, Paray Vieille Poste, both of (FR)

(73) Assignee: Valeo Thermique Moteur, La Verriere (FR)

( * ) Notice: Subject to any disclaimer, the term of this patent is extended or adjusted under 35 U.S.C. 154(b) by 0 days.

(21) Appl. No.: 09/445,978

(22) PCT Filed: Apr. 20, 1999

(86) PCT No.: PCT/FR99/00924

§ 371 Date: Dec. 15, 1999

§ 102(e) Date: Dec. 15, 1999

(87) PCT Pub. No.: WO99/54672

PCT Pub. Date: Oct. 28, 1999

(30) Foreign Application Priority Data

Apr. 20, 1998 (FR) .................................................. 98 04922

(51) Int. Cl.⁷ .................................................. F25B 39/04
(52) U.S. Cl. .............................. 62/509; 165/110; 165/132
(58) Field of Search .................................. 622/509, 507; 165/110, 132

(56) References Cited

U.S. PATENT DOCUMENTS

| | | | |
|---|---|---|---|
| 3,051,450 | * 8/1962 | White et al. | 257/125 |
| 5,159,821 | * 11/1992 | Nakamura | 62/509 |
| 5,505,253 | * 4/1996 | Heraud | 165/110 |
| 5,546,761 | * 8/1996 | Matsuo et al. | 62/509 |
| 5,709,106 | * 1/1998 | Inaba et al. | 62/507 |
| 5,868,002 | * 2/1999 | Matsubayashi | 62/507 |
| 5,884,503 | * 3/1999 | Inaba | 62/509 |
| 6,038,884 | * 3/2000 | Dabrowski | 62/509 |

FOREIGN PATENT DOCUMENTS

| | | |
|---|---|---|
| 0 480 330 | 4/1992 | (EP) . |
| 0 769 666 | 4/1997 | (EP) . |
| 0 838 642 | 4/1998 | (EP) . |
| 9 26282 | 1/1997 | (JP) . |
| 9 184668 | 7/1997 | (JP) . |

* cited by examiner

*Primary Examiner*—Corrine McDermott
*Assistant Examiner*—Marc Norman
(74) *Attorney, Agent, or Firm*—Morgan & Finnegan, LLP

(57) ABSTRACT

The invention concerns an air conditioning condenser for a motor vehicle passenger compartment comprising a reservoir mounted on a base. The reservoir is axially screwed in the base, itself soldered on a manifold box of the condenser, communicating therewith through ducts arranged in the base. The base further comprises a mounting pin for helping to fix the condenser on the support, and/or a linking duct for connecting the condenser to the rest of the refrigerating circuit.

30 Claims, 5 Drawing Sheets

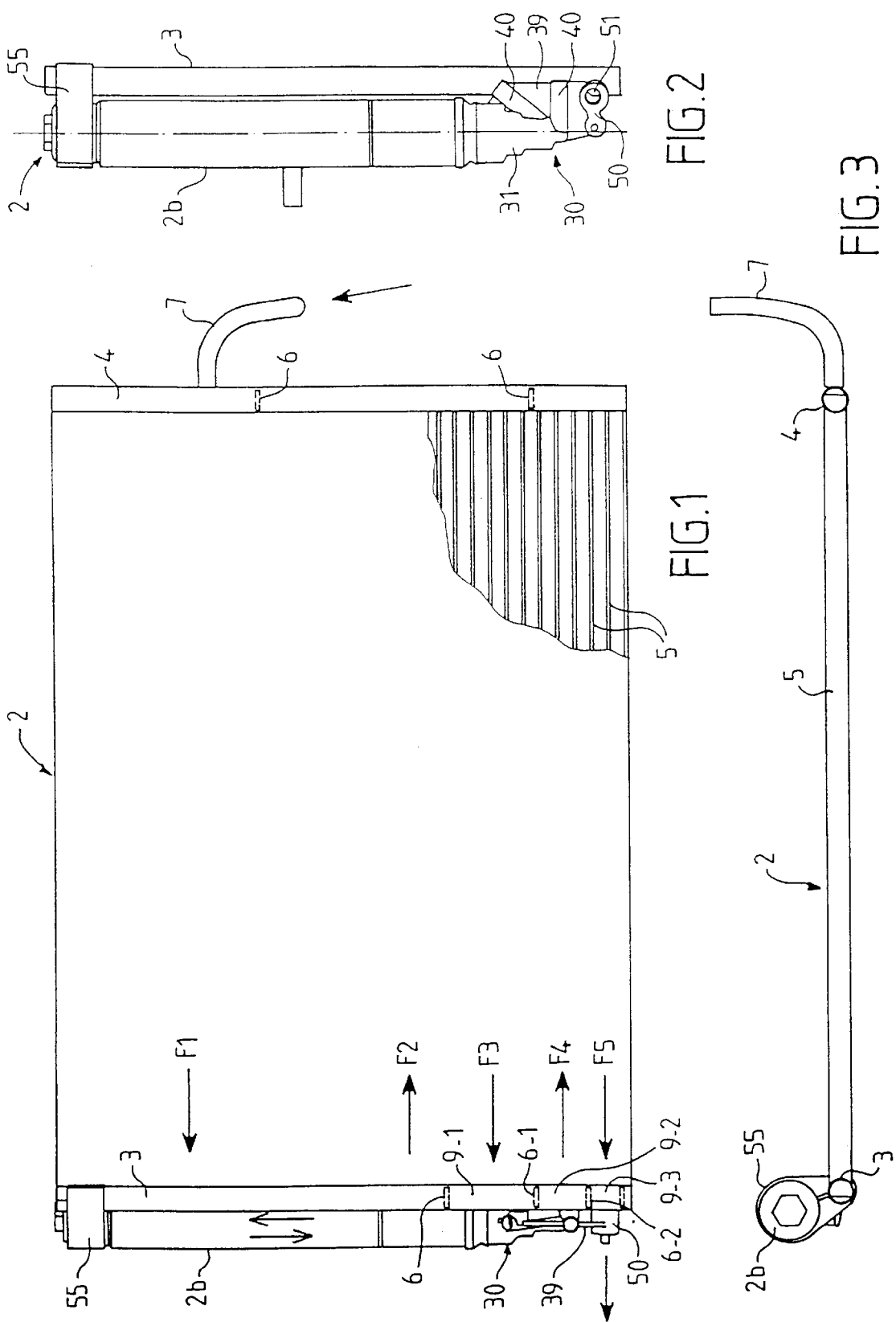

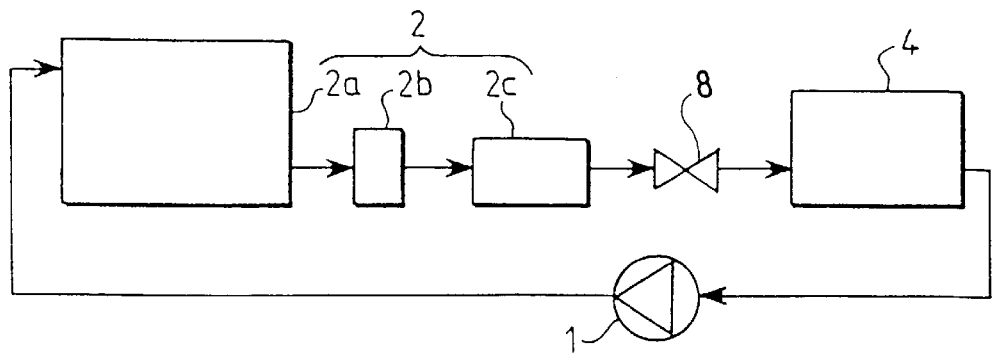
FIG. 4
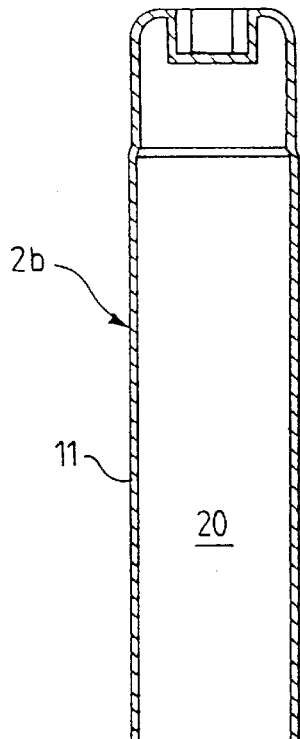
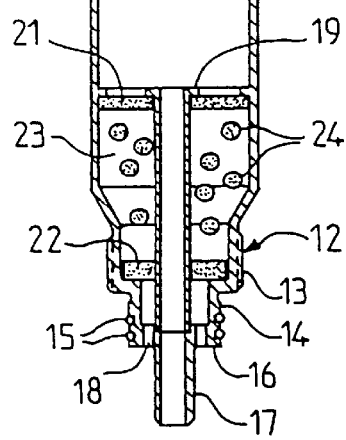
FIG. 5

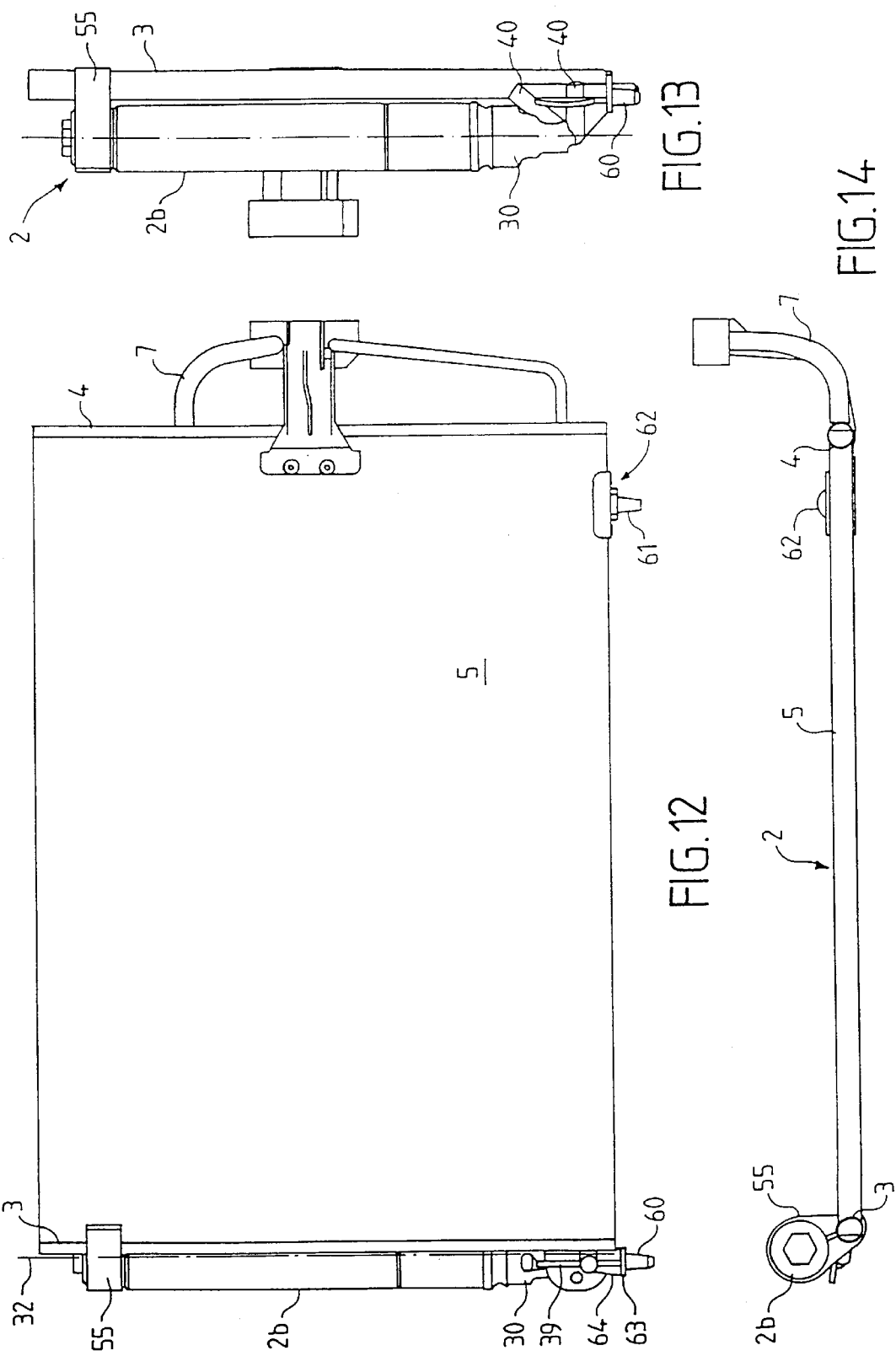

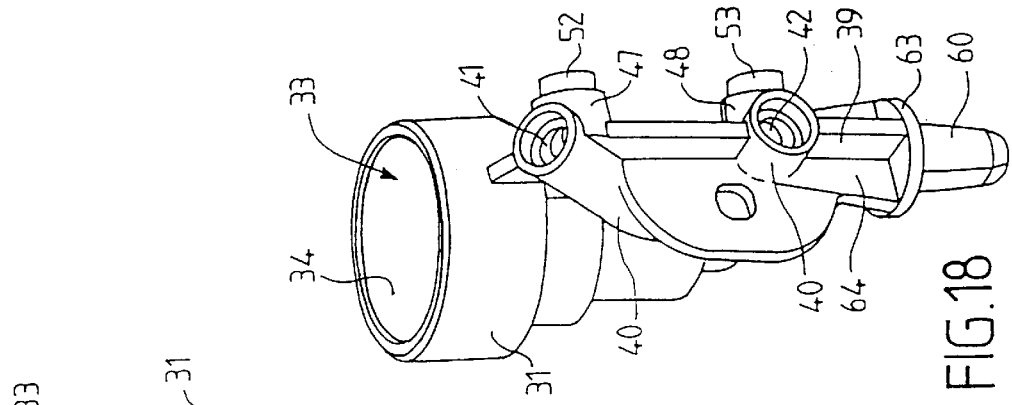
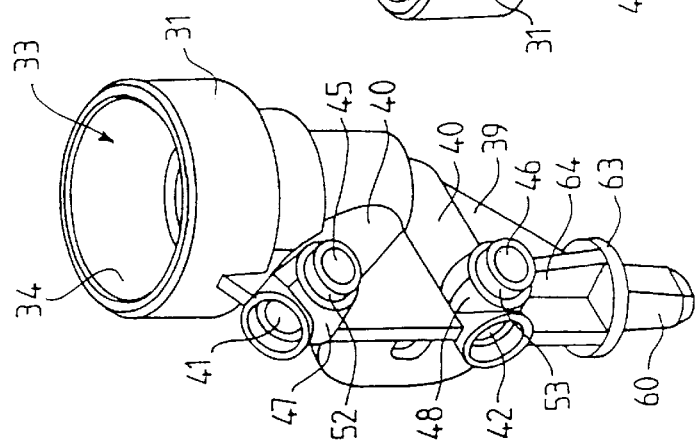
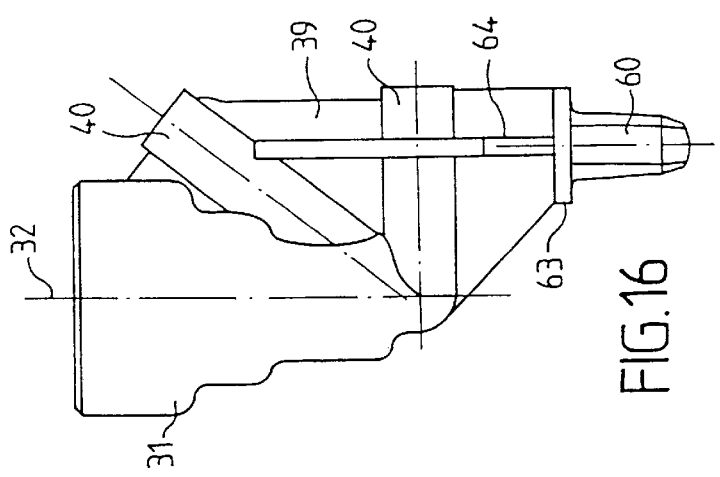
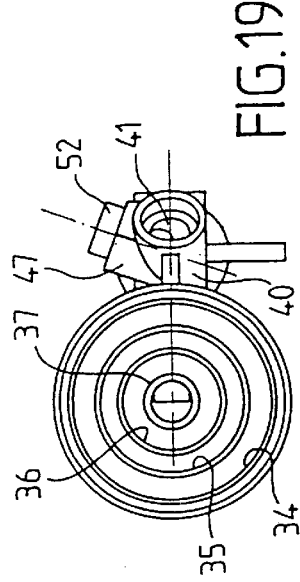
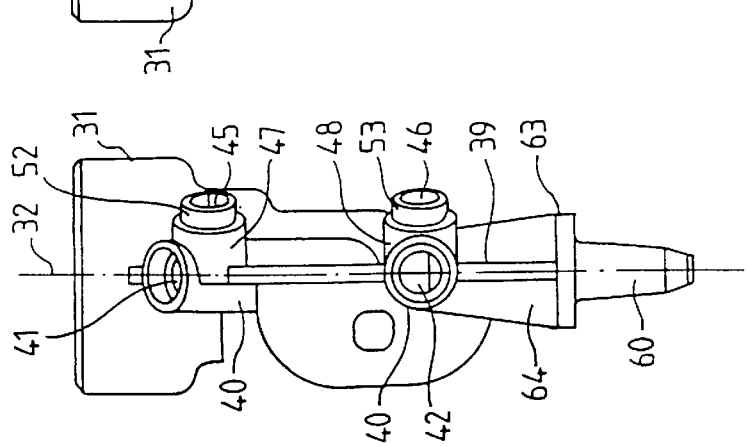

US 6,209,349 B1

AIR CONDITIONING CONDENSER COMPRISING A RESERVOIR MOUNTED ON A BASE

BACKGROUND OF THE INVENTION

The invention relates to a condenser capable of forming part of a fluid circuit, in particular for refrigerating fluid, in an air conditioning device of the passenger compartment of a motor vehicle. The condenser comprises a manifold box and an elongated intermediate reservoir for the treatment and/or the accumulation of the fluid, two communicating pipes being provided for the transfer of liquid between the manifold box with and the reservoir.

In such a condenser, as is well known, the intermediate reservoir may perform all or part of the following functions: filtration and/or dehydration of the refrigerating fluid, compensation of the variations in volume of the fluid, separation of the liquid and gaseous phases. Its intermediate position, i.e. its interposition between an upstream section and a downstream section of the condenser, allows only fluid in the liquid state to be circulated in the section upstream from the reservoir. The fluid is thus undercooled to the liquid/gas equilibrium temperature, improving the performances of the condenser and making the condenser relatively independent of the quantity of fluid contained in the circuit.

EP-A-0 480 330 describes, in a vehicle air-conditioning condenser, an intermediate circuit which is removably fixed to a base integral with the manifold box, through which the two communicating pipes pass.

The object of the invention is to simplify the mounting of the condenser, by making the base at least play a supplementary role with respect to the fluid and mechanical communications.

BRIEF SUMMARY OF THE INVENTION

The invention in particular relates to a condenser of the type defined in the background, and specifies that the base comprises means for fixing the condenser and/or for establishing a fluidic communication between said condenser and the remainder of the circuit.

Complementary or alternative optional characteristics of the invention are given below:

- The means for establishing fluidic communication comprise a connecting pipe passing right through the base.
- The connecting pipe communicates directly by a first of its ends with the manifold box.
- The second end of the connecting pipe forms the outlet of the condenser.
- The first end of the connecting pipe is substantially aligned with the respective ends of the communicating pipes which communicate with the manifold box, in the longitudinal direction of the latter.
- The communicating pipe communicates with the manifold box in the vicinity of the lower end thereof.
- The means for fixing the condenser comprise a mounting pin suitable for being inserted into a connected cavity to contribute to the attachment of the condenser to a support.
- The mounting pin is turned away from the reservoir in relation to the base.
- The mounting pin is turned towards the bottom of the condenser.
- The mounting pin is disposed substantially along an axis parallel to that of the reservoir.
- The condenser comprises a bank of tubes that are parallel to one another and perpendicular to the longitudinal direction of the manifold box, each of which communicates with the manifold box at one of its ends, the bank of tubes bearing a second mounting pin offset in relation to that of the base in the longitudinal direction of the tubes.
- The reservoir is equipped in the vicinity of a first of its ends with an axial thread which cooperates for attachment with the base, the communicating pipes extending therein until opposite the first end.
- The reservoir has an axial pipe fitting for the passage of fluid which projects at its first end in order to be connected in the interior of the base to one of the communicating pipes.
- The reservoir has at its first end apertures for the passage of fluid surrounding the axial pipe fitting and communication with the second of the said communicating pipes.
- The first pipe extends substantially perpendicularly to the longitudinal direction of the reservoir.
- The second pipe is oblique in relation to the longitudinal direction of the reservoir, and deviates from the first pipe in the direction of the manifold box.
- The first and the second pipes are disposed respectively downstream and upstream from the reservoir.
- The base is soldered onto the outer face of a tubular wall delimiting the manifold box.
- The communicating pipes extend substantially tangentially in relation to the said tubular wall and open laterally through said wall.

BRIEF DESCRIPTION OF THE DRAWINGS

The characteristics and advantages of the invention will be exhibited in further detail in the following description, with reference to the attached drawings, in which identical or similar elements are designated in all the figures by reference numbers. On these drawings:

FIGS. 1, 2 and 3 are front, side and top views of a condenser according to the invention, FIG. 4 is a circuit diagram of a refrigerating fluid circuit incorporating the condenser;

FIG. 5 is an axial sectional view of the reservoir;

FIGS. 12, 13 and 14 are views similar to FIGS. 1 to 3, in relation to a second embodiment of the condenser;

FIGS. 15 and 16 are front views of the base in the second embodiment;

FIGS. 17 and 18 are perspective views of the base; and

FIG. 19 is a top view of the base.

DETAILED DESCRIPTION OF THE INVENTION

Figure 8:
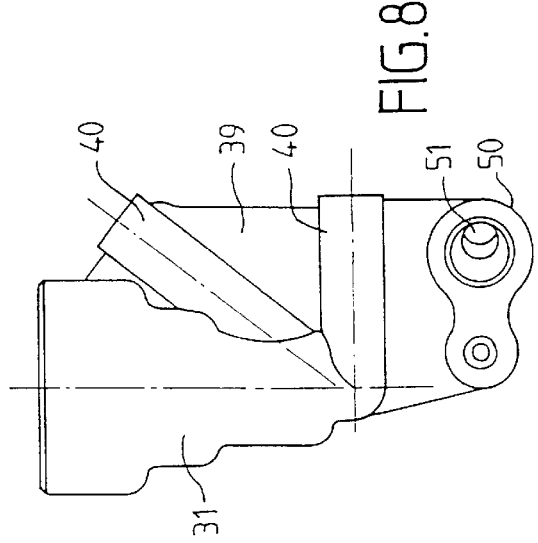
FIGS. 6 to 8 are front views of the base.

FIG. 4 is a circuit diagram of a refrigerating fluid circuit which forms part of an air-conditioning unit for the passenger compartment of a motor vehicle. In known manner, this circuit successively comprises a compressor 1, a unit 2 hereinafter designated under the name of condenser, an expansion valve 8 and an evaporator 4. The condenser 2 comprises an upstream section 2a in which the refrigerating fluid gives up heat to a flow of air so as to condense, after having been, if necessary, "de-overheated" from a inlet temperature greater than the liquid/gas equilibrium temperature. Section 2a is followed by an intermediate reservoir 2b, then by a downstream section 2c in which the fluid is undercooled by heat exchange with the flow of air.

An exemplified embodiment of the condenser 2 is shown in its general structure on FIGS. 1 to 3. It comprises two manifold boxes 3, 4 that are extended vertically and separated from one another in a horizontal direction, and interconnected by a multiplicity of horizontal fluid circulation tubes 5. Each manifold box is divided into different chambers by horizontal partitions 6 so that the fluid circulates, in the tubes 5, alternately from a chamber of the box 3 to a chamber of the box 4, and vice versa, from the upper chamber of the box 4, which communicates with an inlet pipe fitting 7, to the lower chamber of the box 3.

One of the intermediate partitions of the manifold box 3, designated by reference 6-1, separates chambers 9-1 and 9-2 from one another, which are situated respectively above and below the partition 6-1. The chambers communicate between themselves exclusively by means of the reservoir 2b, which is extended vertically and extends along the box 3. The chamber 9-2 is in turn separated from the lower chamber of the box, designated by the reference 9-3, by a partition 6-2.

As can be seen more particularly on FIG. 5, the reservoir 2b comprises a housing formed of a cylindrical body 11 occupying the greater part of its height, and a narrowed neck 12 disposed at its lower part. The neck 12 in turn has a region 13 equipped with an external thread and, beneath this threaded region, a region 14 having a smaller diameter, bored by circumferential grooves for housing two O-ring seals 15. At its lower end, the reservoir 2b has a transversal end wall 16 through which firstly an axial pipe fitting 17 passes, and protrudes upwardly inside the reservoir and downwardly outside said reservoir. Secondly, the transversal end wall has apertures 18 surrounding the pipe fitting 17. The pipe fitting 17 extends upwards to a perforated intermediate partition 19, which the pipe fitting passes through before opening into a free volume 20 contained between the partition 19 and the closed upper end of the reservoir. The pipe fitting extends over the major part of the height thereof. Two washers 21, 22 permeable to fluid surrounding the pipe fitting 17 and resting respectively upwardly on the partition 19 and downwardly on a shoulder connecting the regions 13 and 14, delimit between them an annular treatment volume 23 capable of filtering and/or dehydrating the fluid.

Figure 10:
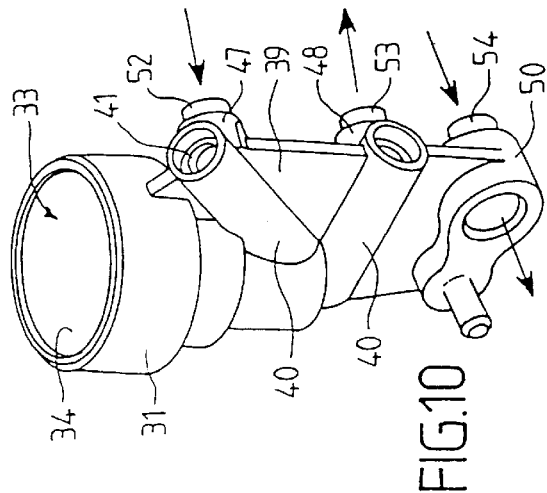
FIGS. 9 and 10 are perspective views of the base.
Figure 7:
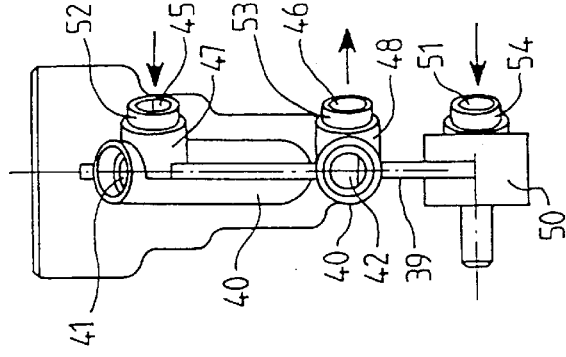
Figure 11:
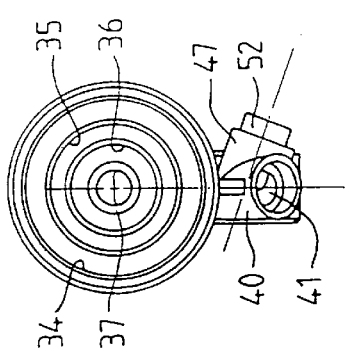
FIG. 11 is a top view of the base.
Figure 6:
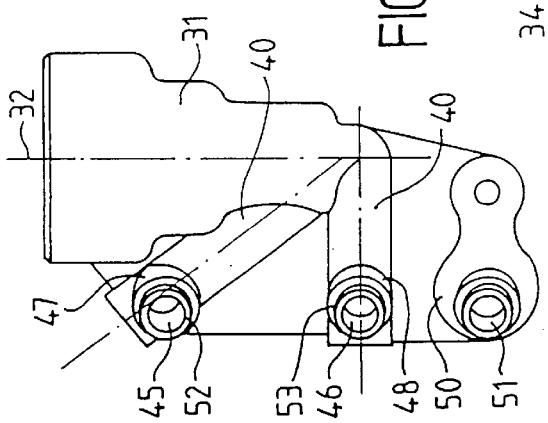
Figure 9:
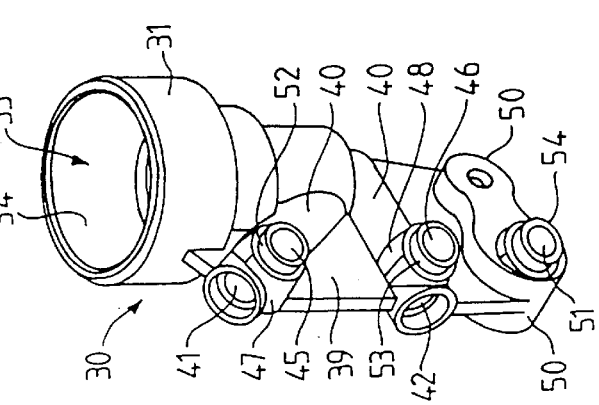

The reservoir 2b is in mechanical and fluidic communication with the manifold box 3 by means of a base 30 which is represented in detail on FIGS. 6 to 11. This base is preferably moulded from an aluminium alloy, and defines a wall 31 substantially generated by rotation around a vertical axis 32, which delimits a receptacle 33 open upwardly for the neck of the reservoir 2b. The lateral surface of the receptacle 33 has, in an upper region, an internal thread 34 cooperating with the thread 13 of the reservoir, in such a manner that the thread of the reservoir also has axis 32 as its axis. A cylindrical median region 35 cooperates with the O-ring seal 15, and a lower cylindrical region 36 surrounds the pipe fitting 17 and delimits an annular space with said fitting, whose free end rests on a seat 37 provided at the bottom of the receptacle 33.

Externally connected to the wall 31 is a shell 39 extending substantially along a plane passing through the axis 32. The shell has, on both sides of this plane, swellings 40 which enable two pipes 41, 42 that are extended parallel to this plane to be housed. In an intermediate production stage of the base, the pipe 41 extends from the free edge of the shell 39 at an angle to horizontal pipe 42 and opens in the receptacle 33, at the level of the above mentioned annular space. The pipe 42 extends horizontally from the free edge of the shell to beneath the receptacle 33, where the pipe 42 forms an elbow upwardly to open at the bottom of said shoulder into the annular seat 37. In the finished base, soldered plugs (not represented) blank off in a tight manner the free ends of the pipes 41, 42 and said pipes open on the outside exclusively by passages 45, 46 provided in the lateral projections 47, 48 formed on the swellings 40.

A projection 50 formed at the lower end of the shell 39 extends on both sides of the plane of said shell. A pipe 51 passes through the projection 50. The projections 47, 48, 50 form, around the ends of the passages 45 and 46 and of the pipe 51 turned towards the manifold box 3, cylindrical tubular end fittings 52, 53, 54, which are mutually aligned with respect to the direction of the axis 32.

The base 30 is fixed on the manifold box 3 by soldering projections 47, 48, 50 on the outer face of the tubular wall of the manifold box, at lest partly made of aluminum sheet, upon the assembly of the condenser. The passages 45 and 46 and the pipe 51 communicate with the chambers 9-1, 9-2 and 9-3 respectively of the box by holes provided in the tubular wall. The end fittings 52 to 54 engage in these holes.

The fluid penetrating through the tube fitting 7 into the upper chamber of the manifold box 4 passes through a first group of tubes as shown by arrow F1 to reach the upper chamber of the box 3, then through two other groups of tubes, as shown by arrows F2 and F3, to pass into the intermediate chamber of the box 4 and into chamber 9-1 of the box 3. The condensed fluid thus arriving in the chamber 9-1 passes therefrom into the annular space in the base by the passage 45 and the inclined pipe 41, then penetrates into the reservoir 2b, which is screwed into the base, via the apertures 18. The fluid then passes through the volume 23 where it is dehydrated and filtered by the particles 24, and accumulates in the volume 20, where the possible residual gaseous phase collects at the upper part. The fluid leaves the volume 20, exclusively in the liquid state, by the tube fitting 17, and reaches the chamber 92 of the manifold box 4 by the horizontal pipe 42 and the passage 46. Thus, the tubes 5 and the chambers of the boxes 3 and 4 situated higher than the partition 6-1, including the chamber 9-1, form the upstream section 2a of the condenser, whereas the tubes and the chambers situated lower than this partition, including the chamber 9-2, form the downstream section 2c. The fluid passes from the chamber 9-2 to the lower chamber of the manifold box 4 as shown by the arrow F4, then is directed towards the chamber according to the arrow F5. The fluid leaves the latter chamber, and the condenser, by the pipe 51, the projection 50 playing the role of outlet pipe and thus replacing an additional connected tube fitting.

A retention flange 55 mechanically connects the upper end of the reservoir 2b to that of the manifold box 3 for a more stable attachment of the reservoir.

The condenser of FIGS. 12 to 14 has the same general constitution as that described hitherto, from which it differs slightly by known characteristics, without relation with the invention, which will not be described in detail. It also differs therefrom by its base, which is represented in detail on FIGS. 15 to 19. This base 30 is identical to that described above with respect to its cooperation with the reservoir 2b and the communication between said reservoir and the chambers of the manifold box 3. It differs therefrom essentially by the absence of the projection 50 and of the pipe 51, and by the presence of a mounting pin 60. The pin 60 is similar to a mounting pin 61 which forms part of an independent piece 62 fixed to the lower edge of the tube bundle 5, in the vicinity of the manifold box 4. Like the pin 61, the pin 60 projects downwardly, along a vertical axis, from a horizontal disk 63, its section being less/lower than the surface of the disk and becoming smaller towards its lower end. In the illustrated example, the axis of the pin 60 is offset in relation to the axis 32 of the reservoir in the direction of the median plane of the tube bundle 5. The disk 63 is disposed perpendicular to the plane of and at the lower end of a cross piece formed by the shell 39 and a rib 64 extending on both sides thereof. The pins 60 and 61 are intended to engage in connected cavities of a support, belonging for example to the automotive body or to the chassis of a vehicle, and contribute to the attachment of the condenser 2. The presence of the pin 60 avoids having to fix a second piece similar to piece 62 onto the bank of tubes in the vicinity of the manifold box 3 as usual in conventional practice.

Of course, the base of the condenser according to the invention may comprise attachment means and/or fluidic communication means which are different from those described by way of example. Similarly, attachment means and communication means may be combined on a single base.

What is claimed is:

1. A condenser capable of forming part of a fluid circuit, the condenser comprising
   a manifold box;
   a base integrally connected to the manifold box; and
   an extended intermediate reservoir for treatment and/or accumulation of fluid, the reservoir removably fixed on the base integral with the manifold box;
   the base having two communicating pipes for the transfer of the fluid between the manifold box and the reservoir, means for fixing the condenser and means for establishing fluidic communication between said condenser and the remainder of the fluid circuit.

2. A condenser according to claim 1, wherein said means for establishing fluidic communication comprises a connecting pipe passing through the base.

3. A condenser according to claim 2, wherein the connecting pipe has a first end and a second end, and wherein the connecting pipe communicates directly by the first end with the manifold box.

4. A condenser according to claim 3, wherein the second end of the connecting pipe forms an outlet of the condenser.

5. A condenser according to claim 3, wherein the first end of the connecting pipe is substantially aligned with the respective ends of the communicating pipes that communicate with the manifold box, in the longitudinal direction of the manifold box.

6. A condenser according to claim 5, the manifold box having a lower end and a upper end, wherein the connecting pipe communicates with the manifold box proximate the lower end.

7. A condenser according to claim 1, wherein the means for fixing the condenser comprises a mounting pin suitable to be inserted into a connection cavity so as to contribute to the fixing of the condenser onto a support.

8. A condenser according to claim 7, wherein the mounting pin is turned away from the direction of the reservoir in relation to the base.

9. A condenser according to claim 8, wherein the mounting pin is turned towards the bottom of the condenser.

10. A condenser according to claim 8, wherein the mounting pin is disposed substantially along an axis parallel to that of the reservoir.

11. A condenser according to claim 8, further comprising a bundle of tubes parallel to one another, the bundle disposed perpendicular to the longitudinal direction of the manifold box, each tube communicating with the manifold box at one of the ends of each tube, said bundle of tubes bearing a second mounting pin offset in relation to the mounting pin of the base in the longitudinal direction of the tubes.

12. A condenser according to claim 1, the reservoir having at least two ends wherein the reservoir is equipped proximate a first end with an axial thread which cooperates for attachment with the base, the communicating pipes extending within the base until opposite the first end of the reservoir.

13. A condenser according to claim 12, wherein the reservoir has an axial pipe fitting for the passage of fluid, said pipe fitting projecting at the first end for connection in the interior of the base to a first of said communicating pipes.

14. A condenser according to claim 13, wherein the reservoir, at the first end, has apertures for passage of fluid surrounding said axial fitting and communication with the second of said communicating pipes.

15. A condenser according to claim 13, wherein the first communicating pipe extends substantially perpendicularly to the longitudinal direction of the reservoir.

16. A condenser according to claim 13, wherein the second communicating pipe is oblique in relation to the longitudinal direction of the reservoir, and deviates from the first communicating pipe in the direction of the manifold box.

17. A condenser according to claim 13, wherein the first communicating pipe and the second communicating pipe are disposed respectively downstream and upstream from the reservoir.

18. A condenser according to claim 1, wherein a tubular wall having an outer face delimits the manifold box, wherein the base is soldered onto the outer face of the tubular wall delimiting the manifold box.

19. A condenser according to claim 18, wherein the communicating pipes extend substantially tangentially in relation to said tubular wall and open laterally through said tubular wall.

20. A vehicle comprising a condenser capable of forming part of a fluid circuit, the condenser comprising
   a manifold box;
   a base integrally connected to the manifold box; and
   an extended intermediate reservoir for treatment and/or accumulation of fluid, the reservoir removably fixed on the base integral with the manifold box;
   the base having two communicating pipes for the transfer of the fluid between the manifold box and the reservoir, means for fixing the condenser and means for establishing fluidic communication between said condenser and the remainder of the fluid circuit.

21. A condenser for a fluid circuit, the condenser comprising:
   a manifold box;
   an extended intermediate reservoir; and
   a base, the manifold box and the reservoir removably connected to the base, the base including:
      two communicating pipes for the transfer of fluid between the manifold box and the reservoir;
      a connecting pipe that passes through the base, the connecting pipe providing fluidic communication between the condenser and the remainder of the fluid circuit; and a mounting pin suitable to be inserted into a connection cavity for fixing of the condenser onto a support.

22. A condenser according to claim 21, the connecting pipe having a first end and a second end, wherein the first end is substantially aligned along the longitudinal direction of the manifold box with the ends of the communicating pipes that are closest the manifold box.

23. A condenser according to claim 21 wherein the mounting pin extends in the opposite direction of the reservoir relative to the base.

24. A condenser according to claim 21 wherein the mounting pin is disposed along an axis substantially parallel to the axis of the reservoir.

25. A condenser according to claim 21, further comprising
a bundle of parallel tubes, an end of each tube communicating with the manifold box, the bundle disposed perpendicular to the longitudinal direction of the manifold box; and
a second mounting pin mounted on the bundle.

26. A condenser according to claim 21, the reservoir having at least two ends, wherein proximate a first end of the reservoir is an axial thread for attachment with the base, and wherein the communicating pipes extend within the base until opposite the first end of the reservoir.

27. A condenser according to claim 26, wherein the reservoir has an axial pipe fitting projecting at the first end of the reservoir, the axial pipe fitting connected in the interior of the base to a first of the communicating pipes, the axial pipe fitting providing for the passage of fluid.

28. A condenser according to claim 27, wherein the reservoir has an aperture surrounding the axial pipe fitting, the aperture connected in the interior of the base to second of the communicating pipes, the aperture providing for passage of fluid surrounding the axial pipe fitting.

29. A condenser according to claim 28
wherein the first communicating pipe extends substantially perpendicularly to the longitudinal direction of the reservoir, and
wherein the second communicating pipe is oblique in relation to the longitudinal direction of the reservoir, and deviates from the first communicating pipe in the direction of the manifold box.

30. A condenser according to claim 29, wherein the first communicating pipe is disposed downstream from the reservoir and the second communicating pipe is disposed upstream from the reservoir.

* * * * *